United States Patent
Hyndman et al.

(10) Patent No.: US 9,305,465 B2
(45) Date of Patent: Apr. 5, 2016

(54) METHOD AND SYSTEM FOR TOPIC BASED VIRTUAL ENVIRONMENTS AND EXPERTISE DETECTION

(75) Inventors: Arn Hyndman, Ottawa (CA); Nicholas Sauriol, Ottawa (CA)

(73) Assignee: Avaya, Inc., Basking Ridge, NJ (US)

( * ) Notice: Subject to any disclaimer, the term of this patent is extended or adjusted under 35 U.S.C. 154(b) by 734 days.

(21) Appl. No.: 13/042,262

(22) Filed: Mar. 7, 2011

(65) Prior Publication Data
US 2012/0229446 A1 Sep. 13, 2012

(51) Int. Cl.
*G06T 15/00* (2011.01)
*G09B 19/00* (2006.01)
*G09B 5/06* (2006.01)

(52) U.S. Cl.
CPC ...... *G09B 19/00* (2013.01); *G09B 5/06* (2013.01); *A63F 2300/8082* (2013.01)

(58) Field of Classification Search
CPC .......................................................... H04N 7/15
USPC ................................................. 345/419, 473
See application file for complete search history.

(56) References Cited

U.S. PATENT DOCUMENTS

| | | | |
|---|---|---|---|
| 7,788,204 B1 * | 8/2010 | Thomas | 706/47 |
| 2005/0019737 A1 * | 1/2005 | Iida et al. | 434/322 |
| 2006/0106647 A1 * | 5/2006 | Brummel et al. | 705/3 |
| 2008/0040673 A1 * | 2/2008 | Zuckerberg et al. | 715/745 |
| 2008/0222295 A1 * | 9/2008 | Robinson et al. | 709/227 |
| 2009/0106671 A1 * | 4/2009 | Olson et al. | 715/757 |
| 2009/0300472 A1 * | 12/2009 | Ambrosino et al. | 715/201 |
| 2010/0070554 A1 * | 3/2010 | Richardson et al. | 709/202 |
| 2010/0228777 A1 * | 9/2010 | Imig et al. | 707/772 |
| 2010/0305909 A1 * | 12/2010 | Wolper et al. | 703/1 |
| 2012/0066038 A1 * | 3/2012 | Issa et al. | 705/14.5 |

* cited by examiner

*Primary Examiner* — Ke Xiao
*Assistant Examiner* — Kyle Zhai
(74) *Attorney, Agent, or Firm* — Christopher & Weisberg, P.A.

(57) ABSTRACT

A method and system for creating a topic-based 3D virtual environment. The inventive method and system provides a 3D virtual environment that includes images, scenery, and content that relate to the topic of discussion in the virtual environment. If the virtual "meeting" should be adjourned or ended, the system saves the data, discussions that occurred during the meeting, and all the scenery and content related to the virtual meeting so that the meeting can be continued with all of the content and imagery in place. A virtual environment template containing this information is loaded and used for subsequent virtual meetings discussing the same topic.

18 Claims, 4 Drawing Sheets

METHOD AND SYSTEM FOR TOPIC BASED VIRTUAL ENVIRONMENTS AND EXPERTISE DETECTION

CROSS-REFERENCE TO RELATED APPLICATION n/a

STATEMENT REGARDING FEDERALLY SPONSORED RESEARCH OR DEVELOPMENT n/a

FIELD OF THE INVENTION

The present invention relates to virtual environments and more particularly to a method and system for creating virtual environment content based on a user's specific topics of interest.

BACKGROUND OF THE INVENTION

Virtual environments simulate actual or fantasy three dimensional ("3D") environments and allow for users to interact with each other and with constructs in the environment via remotely-located clients. In a virtual environment, a universe is simulated within a computer processor/memory. Multiple people may participate in the virtual environment through a computer network, e.g., a local area network or a wide area network such as the Internet. Each participant in the universe selects an "avatar" to represent them in the virtual environment. The avatar is often a 3D representation of a person or other object. Participants send commands to a virtual environment server that controls the virtual environment thereby causing their avatars to move and interact within the virtual environment. In this way, the participants are able to cause their avatars to interact with other avatars and other objects in the virtual environment.

A virtual environment often takes the form of a virtual-reality 3D map, and may include rooms, outdoor areas, and other representations of environments commonly experienced in the physical world. The virtual environment may also include multiple objects, people, animals, robots, avatars, robot avatars, spatial elements, and objects/environments that allow avatars to participate in activities. Participants establish a presence in the virtual environment via a virtual environment client on their computer, through which they can create an avatar and then cause the avatar to "live" within the virtual environment.

As the avatar moves within the virtual environment, the view experienced by the avatar changes according to where the avatar is located within the virtual environment. The views may be displayed to the participant so that the participant controlling the avatar may see what the avatar is seeing. Additionally, many virtual environments enable the participant to toggle to a different point of view, such as from a vantage point outside (i.e. behind) the avatar, to see where the avatar is in the virtual environment.

The participant may control the avatar using conventional input devices, such as a computer mouse and keyboard or optionally may use a more specialized controller. The inputs are sent to the virtual environment client, which forwards the commands to one or more virtual environment servers that are controlling the virtual environment and providing a representation of the virtual environment to the participant via a display associated with the participant's computer.

Depending on how the virtual environment is set up, an avatar may be able to observe the environment and optionally also interact with other avatars, modeled objects within the virtual environment, robotic objects within the virtual environment, or the environment itself, i.e. an avatar may be allowed to go for a swim in a lake or river in the virtual environment. In these cases, client control input may be permitted to cause changes in the modeled objects, such as moving other objects, opening doors, and so forth, which optionally may then be experienced by other avatars within the virtual environment.

"Interaction" by an avatar with another modeled object in a virtual environment means that the virtual environment server simulates an interaction in the modeled environment in response to receiving client control input for the avatar. Interactions by one avatar with any other avatar, object, the environment or automated or robotic avatars may, in some cases, result in outcomes that may affect or otherwise be observed or experienced by other avatars, objects, the environment, and automated or robotic avatars within the virtual environment.

A virtual environment may be created for the user, but more commonly the virtual environment may be persistent, in which it continues to exist and be supported by the virtual environment server even when the user is not interacting with the virtual environment. Thus, where there is more than one user of a virtual environment, the environment may continue to evolve when a user is not logged in, such that the next time the user enters the virtual environment it may be changed from what it looked like the previous time.

Virtual environments are commonly used in on-line gaming, such as for example in online role playing games where users assume the role of a character and take control over most of that character's actions. However, in addition to games, virtual environments are being used to simulate real life environments to provide an interface for users that will enable on-line education, training, shopping, and other types of interactions between groups of users and between businesses and users.

In a business setting, members of the virtual environment may wish to communicate and interact with users in their virtual environment, users in other virtual environments, and people in the real word environment. This is particularly applicable in the business world where "virtual" meetings have become very popular. In a virtual meeting, attendees, by the click of a button, can "enter" a conference room, view the surrounds, converse with real world participants and contribute to the meeting.

Constructing content for 3D virtual environments is both expensive and time consuming. In the "real" world, meetings are typically held in generic meeting rooms. As a result, all relevant materials need to be brought to the meeting room. For example, if a laptop computer is brought to the meeting, the relevant data from the laptop needs to be located and then displayed. In some cases there may be a conflict between all the materials that a meeting attendee wishes to refer to at the meeting and the limited display area on the meeting's projector screen. However, after the meeting, these materials must be packed up and reconstructed if there are any follow-up meetings regarding the same or similar topic.

In the virtual environment world, the same problem arises. It is often desirable to ensure that relevant materials are automatically extracted and displayed on the walls of the virtual environment scene. It is also desirable for displays within the virtual environment to be tailored and updated by participants so that return visits to the virtual environment leave the displays untouched. Thus, virtual meetings covering a similar topic that was presented earlier should be able to display the same materials related to that topic. This is normally done by obtaining data related to that topic and reconstructing entire virtual world environments. Obtaining data related to a specific topic may involve searching multiple databases, a time consuming and costly task. Further, having to reconstruct entire virtual "rooms" and load objects related to the topic at various locations within the room is exceedingly time consuming.

Another difficulty related to virtual business meetings is that the output from formal meetings and informal discussions ancillary to the meeting must typically be manually recorded and are typically not filed in such a way that the data is associated with the formal documents related to the topic. There is a need to ensure that meeting minutes, document updates, new documents, white board sessions and the like are all stored in such a fashion that they can be easily accessed from the virtual environment for that topic.

Another problem encountered in virtual business meetings is that in large organizations it is often difficult to locate experts or even a significant number of interested parties related to a specific topic. There is a need to associate communications and data with specific topics such that a system can collect, over time, information about which topics are of interest to individuals. It is also desirable for a system to deduce which users might qualify as experts on a topic for future consultation.

There is therefore a need for a system that can create content for a virtual environment meeting by constructing a virtual environment template having fixed behaviors, fixed materials and other information related to the topic of the meeting without having to reconstruct the virtual environment meeting.

SUMMARY OF THE INVENTION

The present invention advantageously provides a method and system for creating topic-based virtual environments. In one aspect of the invention, a method for a topic-based virtual environment is provided. The method includes identifying at least one topic, the at least one topic being the subject of a virtual environment instance, selecting a virtual environment template, loading data from a database into the virtual environment template, the data being related to the at least one topic, and rendering the virtual environment instance, the virtual environment including the virtual environment template. In the context of this disclosure, a virtual environment template defines the basic structure for a virtual environment, i.e., rooms, doors, halls, etc., of a virtual building. A virtual environment instance is a live, running virtual environment created and instantiated based on a template. Once instantiated, the virtual environment is populated with avatars and data. Creation of virtual environment templates is typically performed at a different time than an actual meeting in a topic-based virtual environment.

In another aspect of the invention, a system for constructing a topic-based virtual environment is provided. The system includes a template selector, the template selector for selecting a virtual environment template related to at least one topic, the at least one topic being the subject of a virtual environment instance, a database, the database for storing data related to the at least one topic, and a processor, the processor for loading the data related to the at least one topic from the database into the virtual environment template, the virtual environment template included in the virtual environment.

In yet another aspect of the invention, a method of constructing a three-dimensional virtual environment template is provided. The method includes identifying a topic in an initial three-dimensional virtual environment instance, obtaining data from a database, the obtained data related to the identified topic, defining at least one three-dimensional placeholder within the initial three dimensional environment instance, and loading the identified data into the placeholders.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION OF THE INVENTION

Before describing in detail exemplary embodiments that are in accordance with the present invention, it is noted that the embodiments reside primarily in combinations of apparatus components and processing steps related to implementing a system and method for mapping real world users into a virtual environment by providing a mixed reality world where virtual user avatars and real world user avatars are both represented on a viewing screen.

As used herein, relational terms, such as "first" and "second," "top" and "bottom," and the like, may be used solely to distinguish one entity or element from another entity or element without necessarily requiring or implying any physical or logical relationship or order between such entities or elements.

One embodiment of the present invention advantageously provides a method and system for creating a topic-based 3D virtual environment. The inventive method and system provides a 3D virtual environment that includes images, scenery, and content that relate to the topic of discussion in the virtual environment. If the virtual "meeting" should be adjourned or ended, the system saves the data, discussions that occurred during the meeting, and all the scenery and content related to the virtual meeting so that the meeting can be continued with all of the content and imagery in place. Topics discussed and communications exchanged during the meeting are saved, stored and analyzed such that persons having the requisite knowledge of the topic can be identified as experts or interested parties so that they may be consulted during subsequent virtual meetings pertaining to the topic.

Figure 1:
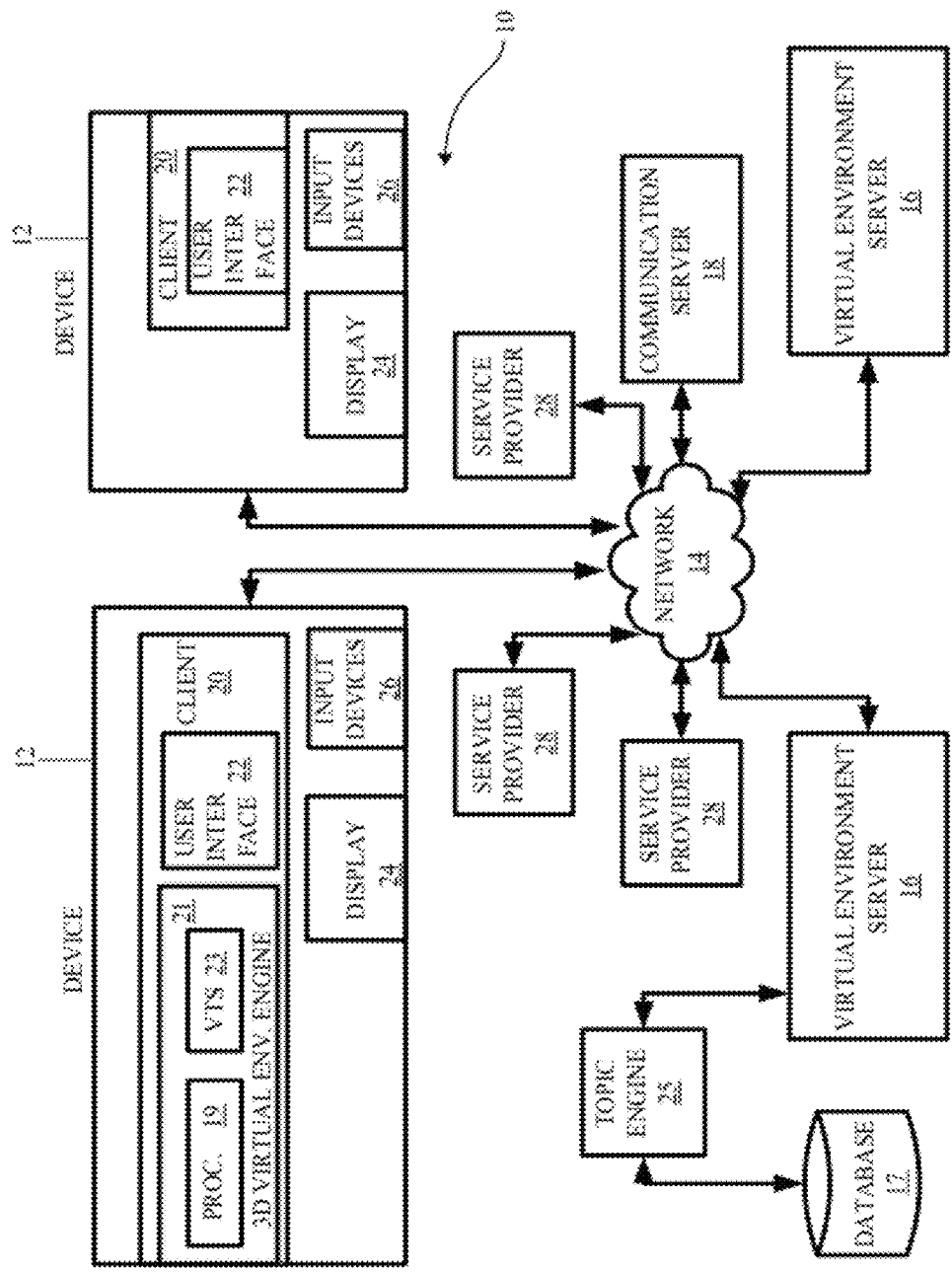
FIG. 1 is a block diagram of an exemplary system showing client interaction between client devices in a virtual environment constructed in accordance with the principles of the present invention.

Referring now to the drawing figures in which like reference designators refer to like elements, there is shown in FIG. 1 an exemplary system 10 showing the interaction between a plurality of users of computing devices 12 and one or more virtual environments. A user may access the virtual environment from their computing device 12 over a packet network 14 or other common communication infrastructure. Communication sessions such as audio calls between the users of the computing devices 12 may be implemented by one or more communication servers 18.

Interaction between virtual environment users in the virtual environment is facilitated by avatars, which are characters representing the users. Each user in the virtual environment has their own avatar and may customize its appearance to their choosing by selecting from various hairstyles, outfits, skin tones, gender, facial features and the like. Movements and interaction of an avatar in the virtual environment is controlled by the corresponding user by using a combination of input/output devices such as a computer mouse, keyboard, audio headset and microphone.

The virtual environment may be implemented as using one or more instances, each of which may be hosted by one or more virtual environment servers 16. Avatars representing users may move within the three-dimensional ("3D") coordinate space of the virtual environment and interact with objects and other avatars within the 3D coordinate space. Virtual environment servers 16 maintain the virtual environment and generate a visual presentation for each user based on the location of the user's avatar within the virtual environment. The view may also depend on the direction in which the avatar is facing and the selected viewing option, such as whether the user has opted to have the view appear as if the user was looking through the eyes of the avatar, or whether the user has opted to pan back from the avatar to see a three dimensional view of where the avatar is located and what the avatar is doing in the three dimensional computer-generated virtual environment.

Computing device 12 runs a virtual environment client 20 and provides a user interface 22 to the virtual environment. Virtual environment client 20 includes a 3D virtual environment engine 21. 3D engine 21 renders the 3D virtual environment. Database 17 contains information related to specific topics that may be raised at virtual meetings. This information, as will discussed in greater detail below, may be placed within the virtual environment where they can be easily accessed and referred to at subsequent meetings relating to the same topic. 3D engine 21 may include processor 19 which, as will be discussed in greater detail below, can create a 3D virtual environment, determine if changes are to be made to the virtual environment, load data from database 17 into the virtual environment, and identify experts and persons having special knowledge or interest in the topic(s) discussed during the virtual environment instance. Processor 19 need not be within 3D engine 21 but can be situated remotely and in communication with engine 21. 3D engine 21 also includes a virtual template selector (VTS) 23, which creates a 3D virtual environment template based on the topic or topics discussed at the virtual meeting.

Each user has a computing device 12 that may be used to access the multi-dimensional computer-generated virtual environment. Notably, virtual environment client 20 within computing device 12 may be a stand-alone software application or may alternatively be a thin client that simply requires the use of an Internet web browser and an optional browser plug-in. A separate virtual environment client 20 may be required for each virtual environment that the user would like to access, although a particular virtual environment client 20 may be designed to interface with multiple virtual environment servers 16. The virtual environment client also enables the user to communicate with other users who are also participating in the multi-dimensional computer-generated virtual environment. The communication portion of the client may be a separate process running on user interface 22.

Computing device 12, virtual environment servers 16 and communication servers 18 each include CPUs, memory, volatile/non-volatile storage, communication interfaces and hardware and software peripherals to enable each to communicate with each other across network 14 and to perform the functions described herein.

The user may see a representation of a portion of the multi-dimensional computer-generated virtual environment on a display 24 and input commands via a user input device 26 such as a mouse, touch pad, or keyboard. Display 24 may be used by the user to transmit/receive audio information while engaged in the virtual environment. For example, display 24 may be a display screen that includes an integrated speaker and microphone. The user interface generates the output shown on display 24 under the control of virtual environment client 20, receives the input from the user via user input device 26 and passes the user input to the virtual environment client 20. Virtual environment client 20 passes the user input to virtual environment server 16 which causes the user's avatar or other object under the control of the user to execute the desired action in the virtual environment. In this way, the user may control a portion of the virtual environment, such as the person's avatar or other objects in contact with the avatar, to change the virtual environment for the other users of the virtual environment.

Figure 2:
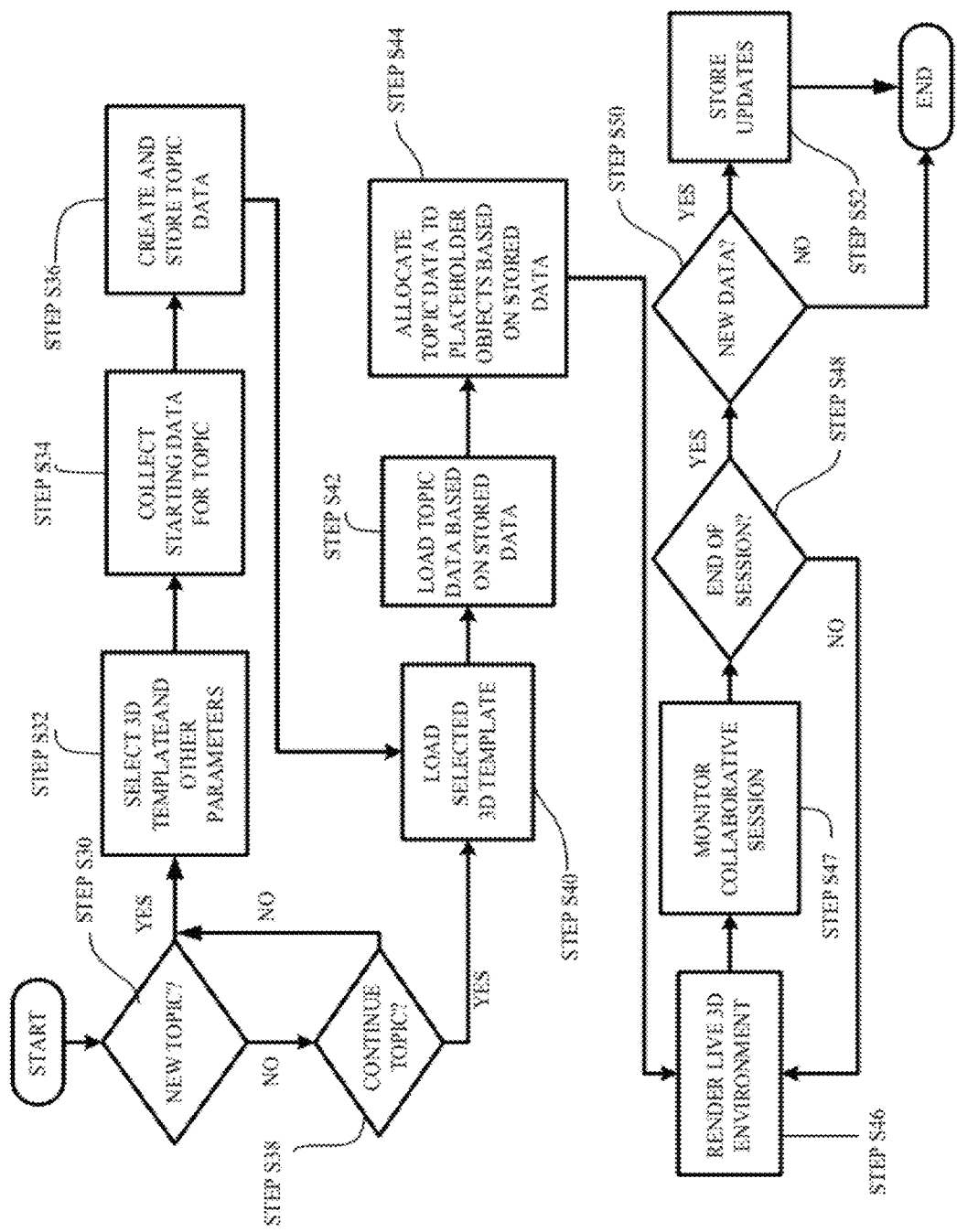
FIG. 2 is a flowchart of an exemplary method for creating a topic-based virtual environment.

A virtual environment instance can consist of one or more virtual environment meetings about one or more specific topics where attendees at the meeting include at least one virtual environment client 20. Subsequent virtual environment meetings may include the same topic or topics discussed or presented in previous virtual meetings. 3D engine 21 renders a virtual environment instance based on a virtual environment template and displays data related to the topic in the content holders of the virtual environment instance. Virtual environment server 16 identifies the stored data related to the topic, loads the data, and updates database 17. In one embodiment, a topic engine 25, which may be part of virtual environment server 16 or may be a separate, related component as shown in FIG. 1, performs the functions of identifying the data, storing the data related to the topic and updating database 17. FIG. 2 illustrates an exemplary embodiment of this process.

In FIG. 2, it is determined if a new topic is discussed, presented or otherwise raised during a virtual environment instance (step S30). This determination is typically based on data provided by the user either at the start of the meeting, i.e., through a user interface dialog, or via parameters passed during meeting instantiation. If it is determined that a new topic is created, virtual template selector 23 of 3D engine 21 creates a three dimensional 3D template and related parameters (step S32). The 3D template may include placeholders that can contain information related to topics raised in the virtual environment meeting. For example, the template and parameters can create spaces such as virtual rooms, desks, walls, and projector screens where information related to the topics raised during the meeting can be displayed. The template may also include 3D areas where 3D objects related to each topic may be placed.

Database 17 stores information according to specific topics. This information is typically provided by a user and contains initial data related to the topic. Once a new topic has been identified, this information is accessed so that the virtual meeting can begin (step S34). Since the topic is new, outside databases may have to be contacted in order to collect information necessary to begin the meeting. For example, attendee lists, attendee background information, and other information related to the new topic may be retrieved from other databases such that data related to the new topic is created and stored in database 17 (step S36).

If it is determined (step S30), that the virtual meeting will contain no new topics but only topics related to a previous meeting (step S38), then the appropriate template is selected and instantiated into the running virtual environment (step S40), and the topic-based data is loaded into the template (step S42). For example, meeting minutes, PowerPoint presentations, and emails from a previous meeting related to a company's marketing budget for the upcoming year are stored together so they may be easily accessed during the next marketing meeting. This "starting" information is created by 3D engine 21 and stored in database 17 (step S36) in such a fashion that any displays, notes, presentations, sub-discussions, and minutes that occurred during a previous virtual meeting can be reproduced and a new meeting can be initiated as a continuation of the previous meeting. In this fashion, the virtual meeting attendees need not be reminded to bring their notes or tax their memories trying to remember where the previous virtual meeting left off. Instead, all materials previously used or displayed are allocated to their respective placeholders within the virtual meeting "room" (step S44).

Once the parameters and data have been loaded into the created 3D template, the 3D engine 21 renders the virtual environment instance (step S46), users can enter the virtual environment, and activities at the meetings are monitored (step S47). When it is determined that the virtual environment instance has concluded (step S48), a record of activities occurring during the meeting are recorded and stored in database 17. For example, this may include the names of those that participated in the meeting, what sub-meetings were held, and what documents were created. Communications, e.g., notes, presentations, discussions, side-bars, etc. related to the meeting are monitored, documented and stored within the database (step S46). If 3D engine 21 determines that new information is provided, (step S50), updates to the existing database 17 are made and the new information is added to the existing record pertaining to the virtual instance and stored (step S52).

Figure 3:
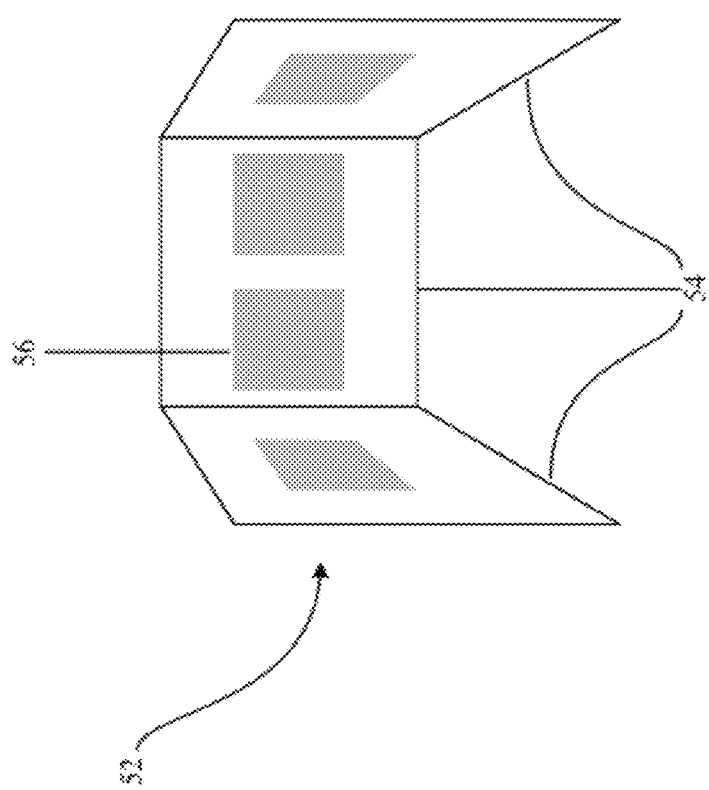
FIG. 3 is a diagram of a virtual environment template as created by an embodiment of the present invention.

When it is determined that a new topic is the subject of a virtual environment instance (step S30), a 3D template for a virtual environment is selected from a set of available templates. FIG. 3 is an illustration of an exemplary embodiment of a virtual 3D environment template 52 selected by virtual template selector 23 of 3D engine 21. The selection of template 52 includes instantiating the template 52 for the new topic and populating placeholders within the template with data related to the topic. Instantiating template 52 may include defining various 3D objects that may appear in a virtual 3D environment. For example, the objects may include building structures, rooms, tables, plants, projector screens, speaker podiums, which may all appear along with avatars representing the participants in a virtual meeting. FIG. 3 illustrates a virtual room having walls 54 and a plurality of placeholders 56 that define a virtual 3D surface in the 3D virtual environment that is to receive data related to the topic being discussed at the virtual meeting.

Placeholders 56 define a particular shape and surface and are sized and oriented within the 3D virtual environment such that they are later filled with data related to the topic of interest. Placeholders 56 map a data texture such as, for example, a web page, a PowerPoint document, or a pdf file, into the 3D virtual environment in an initial location, size and shape defined by template 52. In one typical example, placeholders 56 define a flat rectangular surface. However, template placeholders 56 need not be flat or rectangular but can be of any shape such as a sphere or cube and can include all types of three dimensional shapes.

In addition to placeholders 56, textures within the virtual environment are defined. Examples of textures could be the lighting of the virtual environment world, e.g., brick or plaster walls, light from the sun or light from a florescent desk lamp or overhead skylight, etc. Whichever textures, placeholders 56 and objects chosen for template 52 are saved within database 17 so that they can quickly be accessed to duplicate the virtual environment for subsequent meetings regarding the same topic. Any updates to the textures that occur during the meeting (a meeting that started in the afternoon sunshine and continues into evening dusk) are stored. Further, in some embodiments, placeholders 56 may be customized by allowing them to be moved, edited, and/or deleted to suit the user's needs. Additional placeholders 56 may also be added to walls 54 or other locations throughout the virtual environment. Thus, template 52 may be customized in order to suit the user's needs and according to the activity that occurs during a virtual environment instance.

Topic engine 25 monitors the activities that occur during the virtual environment instance. Processor 19 examines data from the meeting including for example, meeting minutes, conversations and contributions made by meeting attendees and based upon this activity determines if certain meeting attendees possess a particular interest or expertise regarding the topic or topics that are the subject of the virtual meeting.

Figure 4:
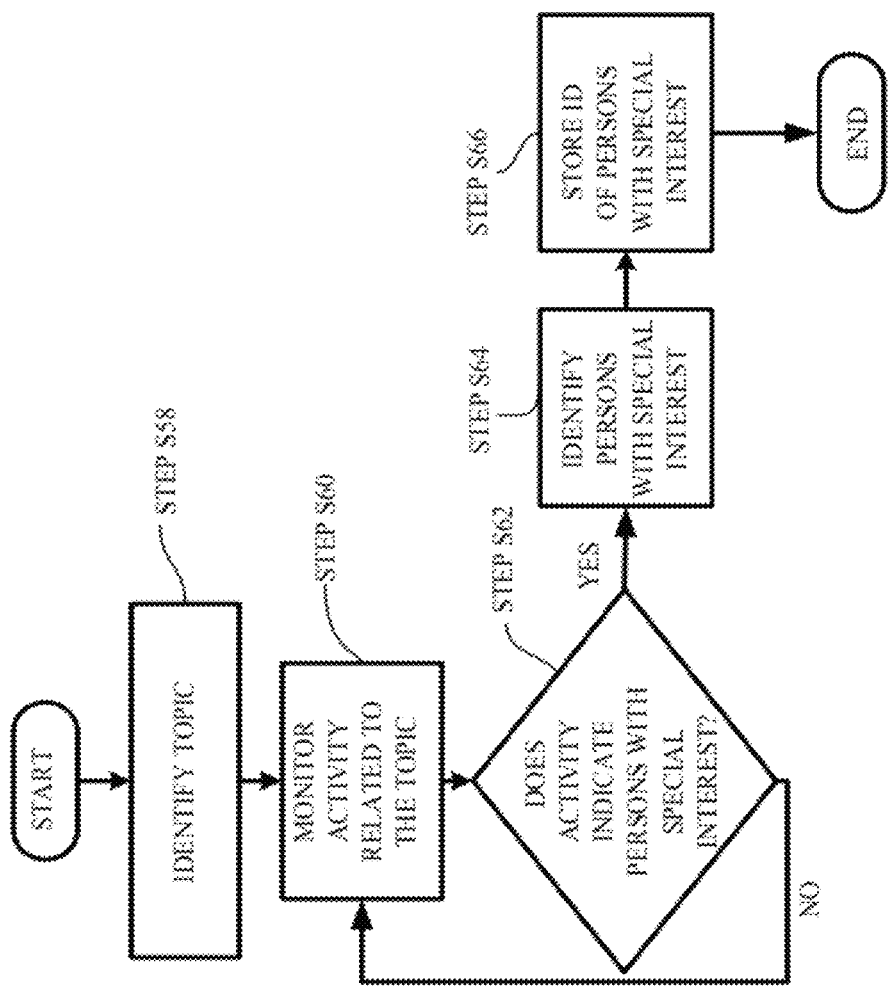
FIG. 4 is a flowchart of an exemplary method for identifying experts and persons of interest for a specific topic in accordance with the principles of the present invention.

FIG. 4 illustrates the process performed by 3D engine 21 to determine if any meeting attendees or company employees qualify as "experts" on the subject topic. Referring to FIG. 4, 3D engine 21 identifies a topic (step S58), and monitors the activity at the virtual environment instance related to that topic (step S60). Processor 19 analyzes the activity determines if one or more persons might qualify as an "expert" on the topic. For example, one or more meeting attendees may submit answers to questions posed by other attendees about a specific subject. Processor 19 determines if the amount of activity, i.e., answers to topic-related questions, exceeds a given threshold that would qualify the attendees that answered the questions as "experts". If so, the names or other identification indicia of these attendees are identified in database 17 as experts so that they can be consulted if the same or similar topics arise at subsequent meetings.

In one embodiment, system 10 detects experts by monitoring one or more inputs and assigning a weight (or score) to each type of input and the quality of that input. Thus, a user is considered more knowledgeable about a topic as their score for that topic increases. A threshold score can be used to determine if a user is qualifies as an "expert". Alternately, the top n-scoring users can qualify as experts.

For example, inputs that can be analyzed to adjust the score for a user may include documents, web pages and/or media displayed or shared by a user. Thus, if a user displays or shares a document related to a topic, their score increases by an amount determined by the relevance of the document to the topic and a base shared media factor. Another input that may be used is text and voice messages generated by a user, where speech-to-text technology may be used for analysis. Thus, if a user talks or texts about a specific topic, their score increases by an amount related to the relevance of the information and a base speech factor.

Other examples of inputs that may be analyzed to determine if a user qualifies as an expert are documents, web pages, and/or media displayed by anyone, but where the user is marked as the author either in the content itself or via metadata. Again, the user's score increases based on the relevance of the document and a base authorship factor. Still another example of an input is participation in meetings related to a specific topic. If a user is a major participant in a meeting, their score increases by an amount related to their level of participation. Participation may be measured by amount of conversation, gestures, media interacted with, time actively controlling ones avatar, etc.

In one embodiment, a formula can be used to assess a user's qualifications as an expert. For example, when a user shares a document or some form of media, an evaluation score can be calculated as follows: Users new score=User's existing score+(shared media relevance*base media sharing factor). This formula is exemplary only and the present invention may be expanded to encompass other formulas to evaluate user performance.

Groups of interested users can be also computed by a similar method, except instead of deriving an expert score for authoring and sharing documents, an interest score is calculated for viewing media and listening to conversation related to a topic. Users can then be filtered according to those having a score higher than some threshold interest score for a particular topic. This will allow organizations to share information about a topic with those who have shown themselves to be interested or to invite users to presentations, meetings, functions, etc.

Thus, processor 19 can access the names of potential experts stored in database 17 to determine if anyone qualifies for expert status. If a particular topic or sub-topic is the subject of communications occurring at a virtual environment instance, and the number of communications or documents referred to exceeds a threshold value, processor 19 determines that there is enough interest in a particular topic or sub-topic to warrant an expert. Database 17 may contain a listing of the names of potential experts, with their backgrounds and area of expertise.

Similarly, instead of "experts", database 17 may store the names of people having an interest in a particular topic or topics. For example, if the virtual environment instance is a virtual meeting of a book club and if processor 19 determines from the activity occurring at the virtual environment meeting that the book club is seeking additional members having an interest in $19^{th}$ century detective fiction, then processor 19 can search database 17 for the name of book club subscribers having such an interest. Database 17 may also store other expert identifiers such as user IDs, email addresses, and phone numbers so that the experts can be identified and contacted.

The identification of experts and persons with interest with regard to a specific topic is not limited to just the communications or answers provided by virtual meeting attendees. Other activities such as documents brought to the meeting, emails exchanged during the meeting, and visuals presented at the meeting are all activities that are monitored by 3D engine 21 to determine if certain individuals qualify as experts about a topic or if certain individuals possess a requisite level of interest such that they may be consulted during a subsequent virtual meeting that raises the same or similar topic.

The present invention can be realized in hardware, software, or a combination of hardware and software. Any kind of computing system, or other apparatus adapted for carrying out the methods described herein, is suited to perform the functions described herein.

A typical combination of hardware and software could be a specialized or general purpose computer system having one or more processing elements and a computer program stored on a storage medium that, when loaded and executed, controls the computer system such that it carries out the methods described herein. The present invention can also be embedded in a computer program product, which comprises all the features enabling the implementation of the methods described herein, and which, when loaded in a computing system is able to carry out these methods. Storage medium refers to any volatile or non-volatile storage device.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form.

In addition, unless mention was made above to the contrary, it should be noted that all of the accompanying drawings are not to scale. Significantly, this invention can be embodied in other specific forms without departing from the spirit or essential attributes thereof, and accordingly, reference should be had to the following claims, rather than to the foregoing specification, as indicating the scope of the invention.

What is claimed is:

1. A method for a topic-based virtual environment, the method comprising:
   identifying at least one topic, the at least one topic being a subject of a virtual environment instance;
   selecting a virtual environment template;
   loading data from a database into the virtual environment template, the data being related to the at least one topic;
   rendering the virtual environment instance, the virtual environment instance including the virtual environment template;
   determining if there is enough interest in a topic to designate, from at least one participant, at least one interested user by calculating an interest score for each of the at least one participant and determining if the interest score exceeds an interest threshold level;
   determining if there is enough interest in a topic to warrant an expert by determining if a number of communications occurring during the virtual environmental instance exceeds an expert threshold level; and
   when there is enough interest in the topic to warrant an expert, analyzing activities of the at least one participant occurring during the virtual environment instance to identify a participant as an expert on the topic to other participants.

2. The method of claim 1, further comprising updating the database to include at least some information presented during the virtual environment instance.

3. The method of claim 1, further comprising compiling a record of activities occurring during the virtual environment instance and storing the record of activities in the database.

4. The method of claim 1, wherein identifying the participant is based on contributions related to the at least one topic made by participants participating in the virtual environment instance.

5. The method of claim 1, further comprising inviting the identified participant to contribute to the subsequent virtual environment instance related to the at least one topic.

6. The method of claim 1, wherein identifying an expert is based on a score, the score is based on a type of activities including at least one of bringing documents to the virtual environment instance, exchanging emails during the virtual environment instance, and presenting visual material during the virtual environment instance.

7. The method of claim 1, wherein identifying an expert is based on a score, the score depends on a relevance to the topic of an input by a participant.

8. The method of claim 7, wherein the relevance to the topic is associated with a document that is input by the participant.

9. The method of claim 7, wherein the relevance to the topic is associated with content of a voice message supplied by the participant.

10. The method of claim 7, wherein the relevance to the topic is associated with a web page displayed by the participant.

11. The method of claim 7, wherein the score is based on a formula that is a function of relevance.

12. The method of claim 7, wherein the score is based on a formula that includes a relevance times a base factor.

13. A system for constructing a topic-based virtual environment comprising:
   a template selector, the template selector configured to select a virtual environment template related to at least one topic, the at least one topic being a subject of a virtual environment instance;
   a database, the database configured to store data related to the at least one topic; and
   a processor, the processor configured to:
      load the data related to the at least one topic from the database into the virtual environment template, the virtual environment template included in the virtual environment instance;
      determine if there is enough interest in a topic to designate, from at least one participant, at least one interested user by calculating an interest score for each of the at least one participant and determining if the interest score exceeds an interest threshold level;
      determine if there is enough interest in a topic to warrant an expert by determining if a number of communications occurring during the virtual environmental instance exceeds an expert threshold level; and
      when there is enough interest in the topic to warrant an expert, analyze activities of the at least one participant occurring during the virtual environment instance to identify a participant as an expert on the topic to other participants.

14. The system of claim 13, further comprising a topic engine, the topic engine updating the database to include at least some information presented during the virtual environment instance.

15. The system of claim 13, wherein the database is configured to store a record of activities occurring during the virtual environment instance.

16. The system of claim 13, wherein the processor is configured to identify the participant based on contributions related to the at least one topic made by participants participating in the virtual environment instance.

17. A method of constructing a three-dimensional virtual environment template, the method comprising:
   identifying a topic in an initial three-dimensional virtual environment instance;
   obtaining data from a database, the obtained data related to the identified topic;
   defining at least one three-dimensional placeholder within the initial three dimensional environment instance;
   loading the identified data into the at least one three-dimensional placeholder;
   selecting the three-dimensional virtual environment template for use in a subsequent three-dimensional virtual environment instance related to the topic identified in the initial three-dimensional virtual environment instance, the at least one three-dimensional placeholder used for the initial three-dimensional virtual environment instance appearing in the subsequent three-dimensional virtual environment instance;
   determining if there is enough interest in a topic to designate, from at least one participant, at least one interested user by calculating an interest score for each of the at least one participant and determining if the interest score exceeds an interest threshold level;
   determining if there is enough interest in a topic to warrant an expert by determining if a number of communications occurring during the virtual environmental instance exceeds an expert threshold level; and
   when there is enough interest in the topic to warrant an expert, analyzing activities of the at least one participant occurring during the virtual environment instance to identify a participant as an expert on the topic to other participants.

18. The method of claim 17, further comprising defining at least one three-dimensional object for use in the initial three-dimensional virtual environment instance.

* * * * *